(12) United States Patent
Sullivan

(10) Patent No.: US 7,287,114 B2
(45) Date of Patent: Oct. 23, 2007

(54) SIMULATING MULTIPLE VIRTUAL CHANNELS IN SWITCHED FABRIC NETWORKS

(75) Inventor: Mark J. Sullivan, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 11/126,443

(22) Filed: May 10, 2005

(65) Prior Publication Data
US 2006/0259656 A1 Nov. 16, 2006

(51) Int. Cl.
G06F 13/00 (2006.01)
G06F 13/10 (2006.01)
G06F 13/20 (2006.01)
G06F 13/28 (2006.01)
H04L 12/56 (2006.01)

(52) U.S. Cl. .......................... 710/316; 710/22; 703/21; 703/22; 711/203; 718/1

(58) Field of Classification Search ............... 710/316, 710/317, 305, 313, 62, 72, 22; 709/220, 709/218, 232, 249, 250, 203; 370/464, 400, 370/360, 386, 362, 351; 711/203; 718/1; 703/21–22
See application file for complete search history.

(56) References Cited
U.S. PATENT DOCUMENTS 6,614,796 B1 * 9/2003 Black et al. ................ 370/403
6,944,152 B1 * 9/2005 Heil ........................... 370/360
6,970,921 B1 * 11/2005 Wang et al. ................ 709/220
7,009,985 B2 * 3/2006 Black et al. ................ 370/403
2004/0264472 A1 12/2004 Oliver et al.
2005/0025119 A1 2/2005 Pettey et al.
2006/0140126 A1 * 6/2006 Zhong et al. ............... 370/241
2006/0259656 A1 * 11/2006 Sullivan ..................... 710/22

OTHER PUBLICATIONS

"Traffic descriptor mapping and traffic control for frame relay over ATM network" by Dixit et al. (abstract only) Publication Date: Feb. 1998.*
Mayhew, D., et al., "PCI Express and Advanced Switching: Evolutionary Path to Building Next Generation Interconnects", *Proc. of the 11th Symp. on High Performance Interconnects*, Aug. 20-22, 2003, Piscataway, NJ, USA, pp. 21-29.

* cited by examiner

*Primary Examiner*—Gopal C. Ray
(74) *Attorney, Agent, or Firm*—Fish & Richardson P.C.

(57) ABSTRACT

Methods and systems, including computer program products, implementing techniques for receiving, at a first device of a switched fabric network, requests from one or more applications, each request being destined for a second device of the network, the first device being connected to the second device by a virtual channel; generating, for each request, a descriptor comprising a traffic class designation; and adding the descriptor to an ordered list of descriptors, the descriptor having a location in the ordered list that is based on the traffic class designation of the descriptor.

24 Claims, 4 Drawing Sheets

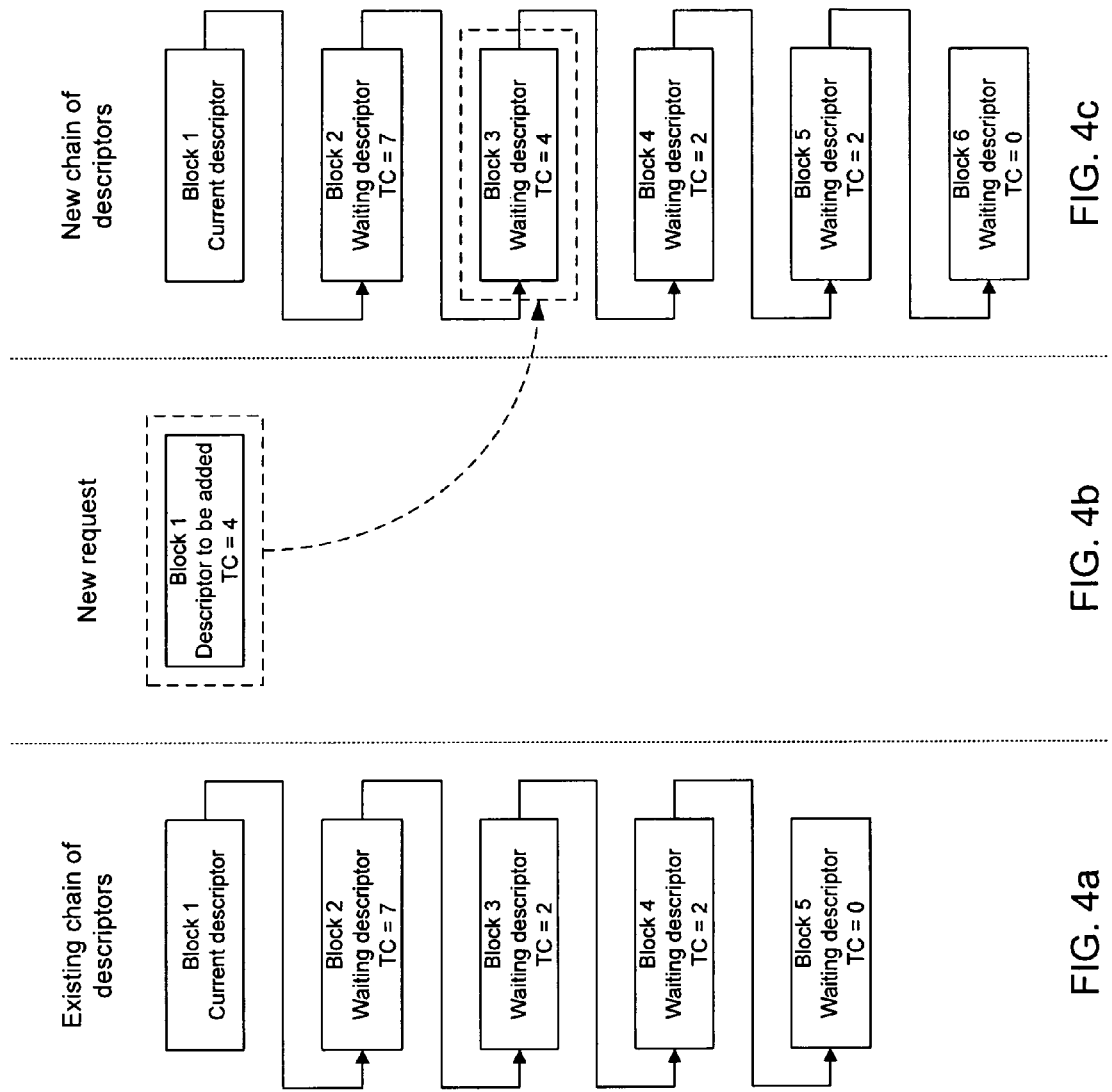

SIMULATING MULTIPLE VIRTUAL CHANNELS IN SWITCHED FABRIC NETWORKS

BACKGROUND

This invention relates to simulating multiple virtual channels in switched fabric networks.

PCI (Peripheral Component Interconnect) Express is a serialized input/output (I/O) interconnect standard developed to meet the increasing bandwidth needs of the next generation of computer systems. The PCI Special Interest Group (PCI-SIG) manages a number of PCI specifications, including the PCI Express Base Specification, Revision 1.0a, Apr. 15, 2003 (available from the PCI-SIG at www-.pcisig.com), as open industry standards, and provides the specifications to its members.

A PCI Express ("PCIe") fabric includes a single PCIe root device (also referred to as a "host processor") that controls a global memory address space of a system having several PCIe I/O devices. These PCIe I/O devices include, e.g., graphics cards, network interface cards, and TV tuner cards, to name a few. Upon power-up and enumeration process, the PCIe root device interrogates the entire system by traversing through the hierarchical tree-topology and locates all PCIe I/O devices in the system. An address space is allocated by the PCIe root device for each PCIe I/O device in the global memory address space in order for the PCIe root device to communicate to it.

Two PCIe I/O devices communicate by first passing data from an originating PCIe I/O device up to the PCIe root device through the address space allocated to the originating PCIe I/O device. The data is then moved to the address space of a destination PCIe I/O device by the PCIe root device and subsequently traverses down to the destination PCIe I/O device. Such communication is not considered to be a direct peer-to-peer relationship between the two PCIe I/O devices but an indirect one managed by the PCIe root device.

PCIe was designed to be fully compatible with the widely used PCI local bus standard. PCI is beginning to hit the limits of its capabilities, and while extensions to the PCI standard have been developed to support higher bandwidths and faster clock speeds, these extensions may be insufficient to meet the rapidly increasing bandwidth demands of PCs in the near future. With its high-speed and scalable serial architecture, PCIe may be an attractive option for use with or as a possible replacement for PCI in computer systems. PCIe is suited for providing scalability in systems with a single PCIe root device with a number of PCIe I/O devices. Since all communication is under the control of a single PCIe root device, the PCIe architecture is generally not well suited for a large application space that includes multi-host and peer-to-peer communication. Advanced Switching Interconnect (ASI) is a technology which is based on the PCIe architecture, and which enables standardization of various backplanes. ASI utilizes a packet-based transaction layer protocol that operates over the PCIe physical and data link layers. The ASI architecture provides a number of features common to multi-host, peer-to-peer communication devices such as blade servers, clusters, storage arrays, telecom routers, and switches. These features include support for flexible topologies, packet routing, congestion management (e.g., credit-based flow control), fabric redundancy, and fail-over mechanisms. The Advanced Switching Interconnect Special Interest Group (ASI-SIG) is a collaborative trade organization chartered with providing a switching fabric interconnect standard, specifications of which, including the Advanced Switching Core Architecture Specification, Revision 1.0, December 2003 (available from the ASI-SIG at www.asi-sig.com), it provides to its members.

BRIEF DESCRIPTION OF THE DRAWINGS

FIG. 4*a* shows an example of an existing linked list.

FIG. 4*b* shows a descriptor to be added to the linked list.

FIG. 4*c* shows an example of a new linked list including the descriptor of FIG. 3*b*.

DETAILED DESCRIPTION

Figure 1:
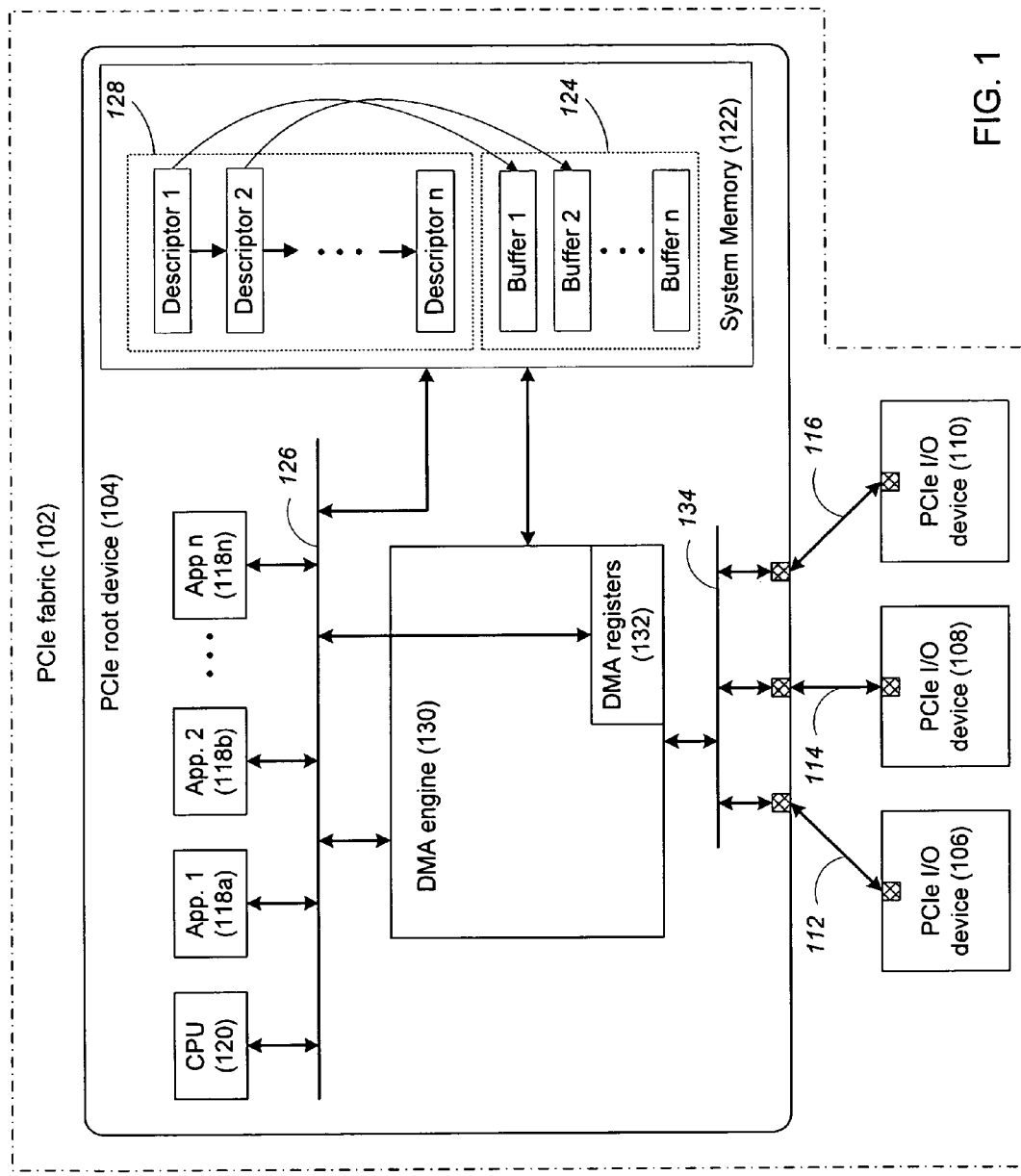
FIG. 1 is a block diagram of a switched fabric network.

Referring to FIG. 1, a PCI Express (PCIe) fabric 102 is a system including a PCIe root device 104, and multiple PCIe I/O devices 106, 108, 110, all interconnected via PCIe links 112, 114, 116. Each device 104, 106, 108, 110 of the PCIe fabric 102 has a PCIe interface that is part of the PCIe architecture defined by the PCI Express Base Specification. Each device 104, 106, 108, 110 is mapped in a single flat address space and can be addressed by PCI-like load store accesses.

In order for the PCIe root device 104 to be compliant to the PCI Express Base Specification, the PCIe root device 104 needs to implement at least one Virtual Channel (i.e., VC0) at each of its PCIe ports (each depicted in FIG. 1 by a square with cross hatching), and can support up to eight VCs (i.e., VC0 to VC7) per PCIe port. The PCIe architecture includes a PCIe VC mechanism that provides support for carrying, throughout the PCIe fabric 104, traffic that is differentiated using Traffic Class (TC) designations, of which there are generally eight (i.e., TC0 to TC7) regardless of the number of VCs that are supported by the device. TC designations are used to apply appropriate servicing policies at service points (e.g., a PCIe switch (not shown)) within the PCIe fabric 102. In the PCIe architecture, priority levels for traffic ranges from highest (i.e., traffic with a TC7 designation) to lowest (i.e., traffic with a TC0 designation).

PCIe fabric traffic is associated with VCs by mapping packets with particular TC designations to their corresponding VCs. The PCIe VC mechanism allows for flexible mapping of TCs onto the VCs. In the simplest form, TCs can be mapped to VCs on a 1:1 basis. To allow for performance/cost tradeoffs, multiple TCs can be mapped to a single VC. However, one problem that may arise when multiple TCs are mapped to a single VC is that packets placed on the single VC are subject to blocking conditions as packets with different assigned TC designations do not have ordering requirements between them. In such a scenario, there is no differentiation of traffic flows between the two PCIe devices 104, 106, 108, 110.

The example techniques described below allow a PCIe root device 104, implemented with a chipset that supports only one VC per PCIe port (i.e., with a chipset that supports only one VC), to simulate multiple virtual channels between the PCIe root device 104 and each PCIe I/O device 106, 108, 110. Although the example techniques are described in a PCIe-based storage system context, the techniques are also applicable to other PCIe-based systems (e.g., a PCIe-based networking communications system) and other switched fabric network systems (e.g., an ASI-based blade computing system, and an ASI-based storage system).

In the storage system context, each PCIe I/O device 106, 108, 110 is a storage device that includes memory space to which data can be read from or written to (using read or write requests, respectively) by one or more applications (e.g., video editing applications, computer aided drafting (CAD) applications) at the PCIe root device 104.

Figure 2:
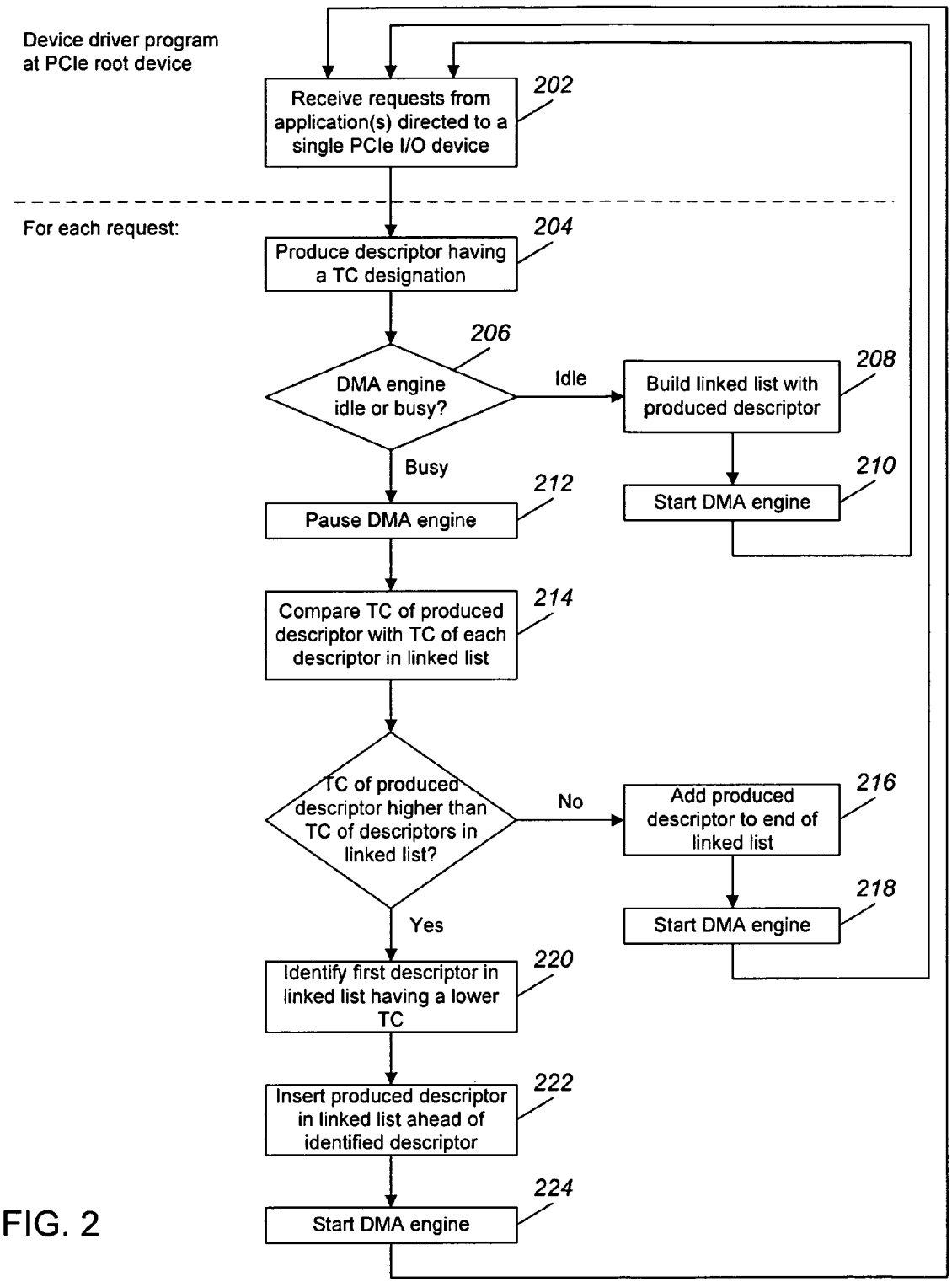
FIG. 2 is a flowchart of a descriptor linked list generation process at a device of a switched fabric network.
Figure 3:
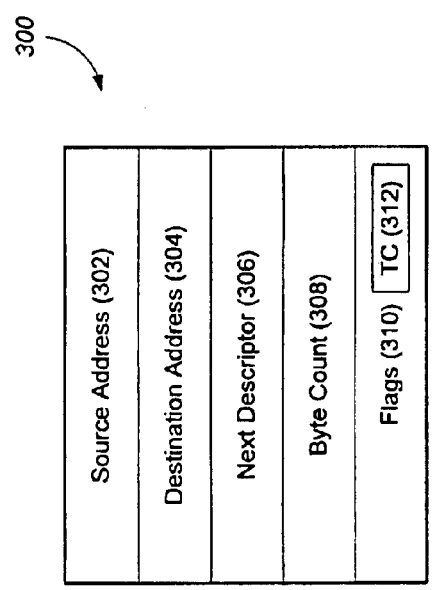
FIG. 3 is a diagram of a descriptor.

In the example scenario described below with reference to FIGS. 2 and 3, one application (e.g., App. 1 118a) generates write requests directed to the PCIe I/O device 106 and another application (e.g., App. 2 118b) generates write requests also directed to the same PCIe I/O device 106. The write requests are received (202) by a device driver program running on a central processing unit (CPU) 120 of the PCIe root device 104 in the order in which the requests are generated by the applications.

The CPU 120 may be a microprocessor, microcontroller, programmable logic, or the like, which is capable of executing instructions (e.g., a device driver program) to perform one or more operations. Such instructions may be stored in a system memory 122 (i.e., local memory) or some other storage device, which may be one or more hard drives or other internal or external memory devices connected to the CPU 120 via one or more communications media, such as a bus 126.

The CPU 120 executes instructions of the device driver program to produce (204), for each write request received from an application 118a-118n, a descriptor 300 (e.g., Descriptor 1, Descriptor 2, . . . Descriptor n) that contains a Source Address 302, a Destination Address 304, a Next Descriptor Address 306, a Byte Count 308, and a set of flags 310. Each descriptor describes a block of data (the size of which is defined by the Byte Count) that is to be moved from the location in a memory space of the PCIe root device 104 associated with the Source Address to a memory space of the PCIe I/O device 106 associated with the Destination Address. The set of flags 310 includes a 3-bit TC field 312.

In some implementations, the device driver program automatically sets the 3-bit TC field 312 by request. That is, the application 118a-118n specifies the TC designation that is associated with the request and the device driver program sets the bits accordingly. Each application 118a-118n may specify a single TC designation to be associated with all requests it generates, specify multiple different TC designations to be associated with the requests it generates, or alternatively, in the instance of a multi-threaded application, the application may specify different TC designations for each thread. In other implementations, the device driver program automatically sets the 3-bit TC field 312 by application 118a-118n. That is, the device driver program identifies the application 118a-118n that generated the request and sets the bits accordingly.

Upon producing a descriptor ("produced descriptor") for a write request received from an application, the device driver program first determines (206) whether a direct memory access ("DMA") engine 130 of the PCIe root device 104 is idle or busy.

If the DMA engine 130 is idle, the device driver program builds (208) an ordered list (e.g., linked list 128 in the system memory 122) using the produced descriptor and sets a bit in a register 132 of the DMA engine 130 to start (210) the DMA engine 130. Once started, the DMA engine 130 is configured to process the descriptors in the linked list 128 in sequential order starting with the descriptor at the head of the linked list 128. In the example scenario, the DMA engine 130 processes the descriptor by generating a PCIe transaction layer packet (TLP) based on the descriptor, and selecting a PCIe port to which the PCIe TLP is transferred via an internal bus 134. In the standard PCIe root device 104 of FIG. 1, the PCIe TLP would be transferred to a physically unique downstream port instance, consisting minimally of a PCIe physical layer, a PCIe data link layer, and a PCIe transaction layer interface.

If the DMA engine 130 is busy processing a descriptor ("currently-processed descriptor"), the device driver program sets a bit in a register 132 of the DMA engine 130 to pause (212) the DMA engine 130, and compares (214) the TC of the produced descriptor with the TC of each descriptor in the linked list 128, starting with the descriptor to which the currently-processed descriptor points, until the device driver program identifies a descriptor having a lower TC designation than that of the produced descriptor.

If the device driver program reaches the tail end of the linked list 128 before such identification is made, the device driver program adds (216) the produced descriptor to the tail end of the linked list 128 and sets a bit in a register of the DMA engine 130 to start (218) the DMA engine 130.

If, however, the device driver program locates a descriptor ("identified descriptor") having a lower TC designation than that of the produced descriptor, the device driver program breaks the chain of descriptors that form the linked list 128, and inserts (220) the produced descriptor between the identified descriptor and its previous descriptor using conventional techniques. Once the produced descriptor has been inserted into the linked list, the device driver program sets a bit in a register of the DMA engine 130 to start (222) the DMA engine 130.

The device driver program enables the DMA engine 130 to be paused, queried, and started (or restarted) in its processing of the descriptors of the linked list 128. FIG. 4a shows an example of the linked list 128 in the system memory 122 when a produced descriptor (FIG. 4b) having a TC designation of TC4 ("most-recently produced descriptor") is to be added to the linked list 128. By enabling the most-recently produced descriptor to be inserted into the linked list 128 based on its TC designation rather than automatically appended to the end of the linked list 128, the order in which the descriptors are processed by the DMA engine 130 relative to the order in which the descriptors are generated can be modified as shown in FIG. 4c. In so doing, PCIe TLPs with higher priority levels (as indicated by the TC designations) can be sent by the PCIe root device 104 to the PCIe I/O device 106 ahead of PCIe TLPs with lower priority levels (as indicated by the TC designations). This simulates multiple virtual channels and prioritization of packet traffic between the PCIe root device 104 and the PCIe I/O device 106 even though the PCIe root device 104 is implemented with a chipset that supports only one VC per PCIe port without the simulation.

In one embodiment, the invention and all of the functional operations described in this specification can be implemented in digital electronic circuitry, or in computer hardware, firmware, software, or in combinations of them. In one embodiment, the invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The techniques of one embodiment of the invention can be performed by one or more programmable processors executing a computer program to perform functions of the embodiment by operating on input data and generating output. The techniques can also be performed by, and apparatus of one embodiment of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

One embodiment of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), e.g., the Internet, and a wireless network.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. In some embodiments of the invention, the techniques include receiving requests from applications for services to be provided, and putting the requests in an order for delivery from a first device of a switched fabric network through a virtual channel to a second device of the network at which the services are to be provided, the order being based on traffic class designations associated with the requests. In some embodiments of the invention, the techniques include controlling an order in which requests from applications for services are delivered from a first device of a switched fabric network through a virtual channel to a second device of the network to simulate multiple virtual channels of requests passing through the virtual channel.

Other embodiments are within the scope of the following claims. For example, the techniques of an embodiment of the invention can be performed in a different order and still achieve desirable results. The techniques are applicable in the ASI fabric context in which a first ASI endpoint and a second ASI endpoint are connected via a single VC. In one example, the first ASI endpoint has one or more applications that generate read requests destined for the second ASI endpoint. The first ASI endpoint can be implemented to include a device driver program that enables a DMA engine to be paused, queried, and started (or restarted) in its processing of descriptors in a linked list in a manner similar to that described above with reference to FIGS. 1 and 2. The second ASI endpoint can be similarly implemented with a device driver and a DMA engine that allows for responses to the read requests to be prioritized.

What is claimed is:

1. A method comprising:
   at a first device of a switched fabric network, the first device being connected to a second device of the switched fabric network by a virtual channel,
      receiving requests from one or more applications, each request being destined for the second device;
      generating, for each request, a descriptor comprising a traffic class designation; and
      adding the descriptor to an ordered list of descriptors, the descriptor having a location in the ordered list that is based on the traffic class designation of the descriptor, the ordered list to establish an order for delivery of each request from the first device through the virtual channel to the second device.

2. The method of claim 1, wherein the switched fabric network comprises a Peripheral Component Interconnect-Express (PCIe) fabric, the first device comprises a PCIe root device, and the second device comprises a PCIe input/output (I/O) device.

3. The method of claim 1, wherein the switched fabric network comprises an Advanced Switching Interconnect (ASI) fabric, the first device comprises a first ASI endpoint, and the second device comprises a second ASI endpoint.

4. The method of claim 1, wherein the descriptor further comprises one or more of a source address, a destination address, a next descriptor address, a byte count, and a set of flags.

5. The method of claim 1, wherein the descriptor describes a block of data to be moved from a source address to a destination address.

6. The method of claim 5, wherein the source address is associated with a memory space of the first device.

7. The method of claim 5, wherein the destination address is associated with a memory space of the second device.

8. The method of claim 1, wherein the ordered list comprises a linked list formed by a chain of descriptors.

9. The method of claim 1, wherein for the descriptor to be added to the ordered list, the method comprises:
   sequentially comparing the traffic class designation of the descriptor to be added with the traffic class designations of the descriptors in the ordered list; and
   inserting the descriptor to be added into the ordered list based on the comparison.

10. The method of claim 9, wherein the descriptor to be added is inserted ahead of a first descriptor in the ordered list having a lower priority level.

11. The method of claim 9, wherein the descriptor to be added is inserted at a tail end of the ordered list.

12. The method of claim 1, further comprising:
   processing the descriptor in the ordered list to generate a corresponding packet; and
   sending the packet to the second device over the virtual channel.

13. A machine-readable medium that stores executable instructions for use at a first device of a switched fabric network, the first device being connected to a second device of the switched fabric network by a virtual channel, the instructions when executed causing a machine to:
  receive requests from one or more applications, each request being destined for the second device;
  generate, for each request, a descriptor comprising a traffic class designation; and
  add the descriptor to an ordered list of descriptors, the descriptor having a location in the ordered list that is based on the traffic class designation of the descriptor, the ordered list to establish an order for delivery of each request from the first device through the virtual channel to the second device.

14. The machine-readable medium of claim 13, wherein the instructions to add the descriptor comprises instructions to:
  sequentially compare the traffic class designation of the descriptor to be added with the traffic class designations of the descriptors in the ordered list; and
  insert the descriptor to be added into the ordered list based on the comparison 15. The machine-readable medium of claim 14, wherein the descriptor to be added is inserted ahead of a first descriptor in the ordered list having a lower priority level.

16. The machine-readable medium of claim 14, wherein the descriptor to be added is inserted at a tail end of the ordered list.

17. The machine-readable medium of claim 13, further comprising instructions to:
  process the descriptor in the ordered list to generate a corresponding packet; and
  send the packet to the second device over the virtual channel.

18. A system comprising:
  a first device;
  a second device;
  the first device and the second device in communication via a virtual channel of a switched fabric network, the first device being operative to:
    generate, for each request received from an application of the first device, a descriptor comprising a traffic class designation; and
    add the descriptor to an ordered list of descriptors, the descriptor having a location in the ordered list that is based on the traffic class designation of the descriptor, the ordered list to establish an order for delivery of each request from the first device through the virtual channel to the second device.

19. The system of claim 18, wherein the first device being further operative to:
  sequentially compare the traffic class designation of the descriptor to be added with the traffic class designations of the descriptors in the ordered list; and
  insert the descriptor to be added into the ordered list based on the comparison.

20. The system of claim 18, wherein the switched fabric network comprises a Peripheral Component Interconnect-Express (PCIe) fabric, the first device comprises a PCIe root device, and the second device comprises a PCIe input/output (I/O) device.

21. The system of claim 18, wherein the switched fabric network comprises an Advanced Switching Interconnect (ASI) fabric, the first device comprises a first ASI endpoint, and the second device comprises a second ASI endpoint.

22. A machine-readable medium that stores executable instructions, the instructions when executed causing a machine to:
  use an ordered list of descriptors to control an order in which requests from applications for services are delivered from a first device of a switched fabric network through a virtual channel to a second device of the network to simulate multiple virtual channels of requests, each descriptor of the ordered list corresponding to a request from an application for a service, each descriptor having a location in the ordered list that is based on a traffic class designation associated with its corresponding request.

23. The machine-readable medium of claim 22, wherein the switched fabric network comprises a Peripheral Component Interconnect-Express (PCIe) fabric, the first device comprises a PCIe root device, and the second device comprises a PCIe input/output (I/O) device.

24. The machine-readable medium of claim 22, wherein the switched fabric network comprises an Advanced Switching Interconnect (ASI) fabric, the first device comprises a first ASI endpoint, and the second device comprises a second ASI endpoint.

* * * * *